Jan. 6, 1948. H. W. McDOWELL 2,433,860
PLOTTING APPARATUS
Filed March 19, 1946 3 Sheets-Sheet 1
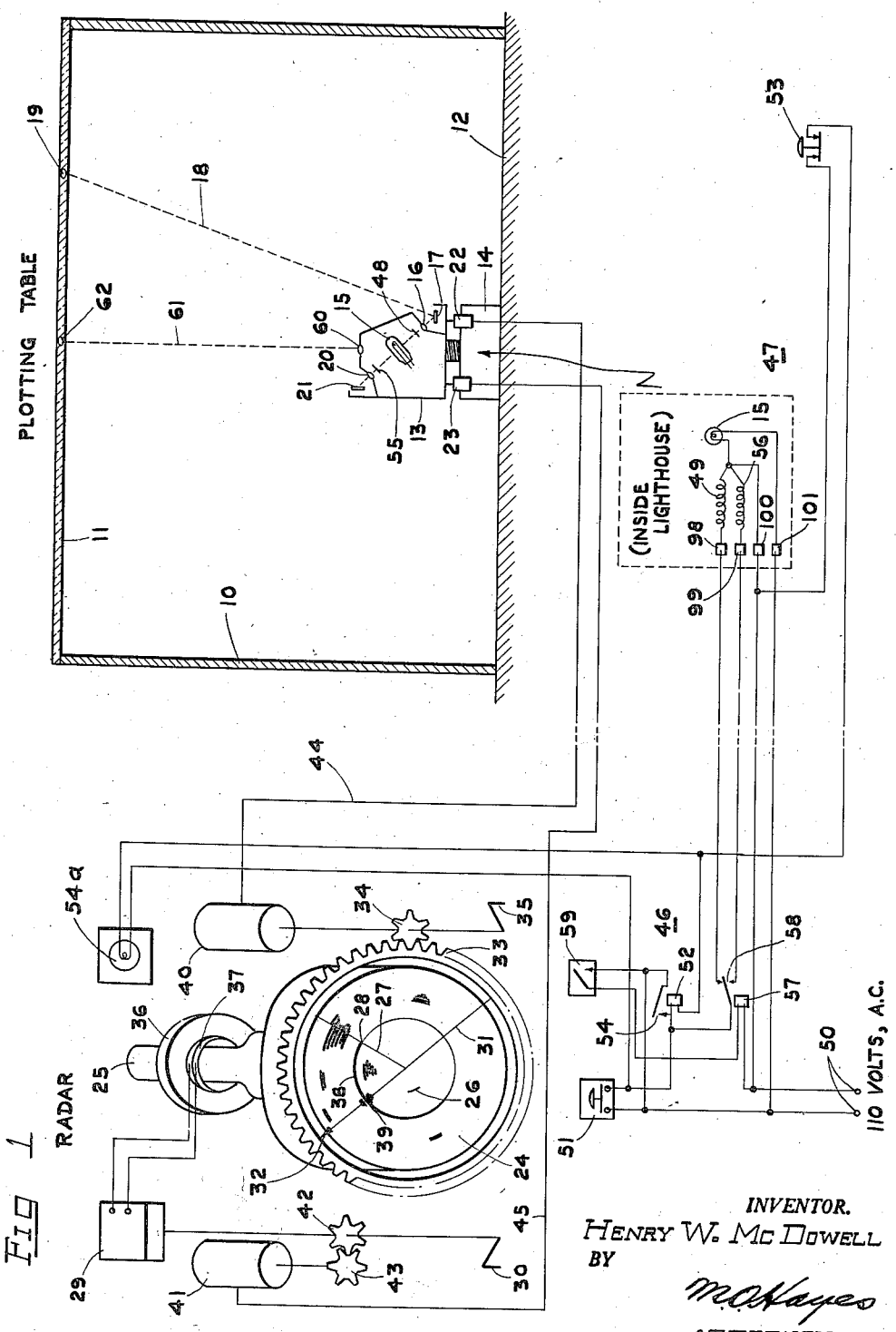
INVENTOR.
HENRY W. McDOWELL
BY
M. O. Hayes
ATTORNEY Jan. 6, 1948.  H. W. McDOWELL  2,433,860
PLOTTING APPARATUS
Filed March 19, 1946  3 Sheets-Sheet 2
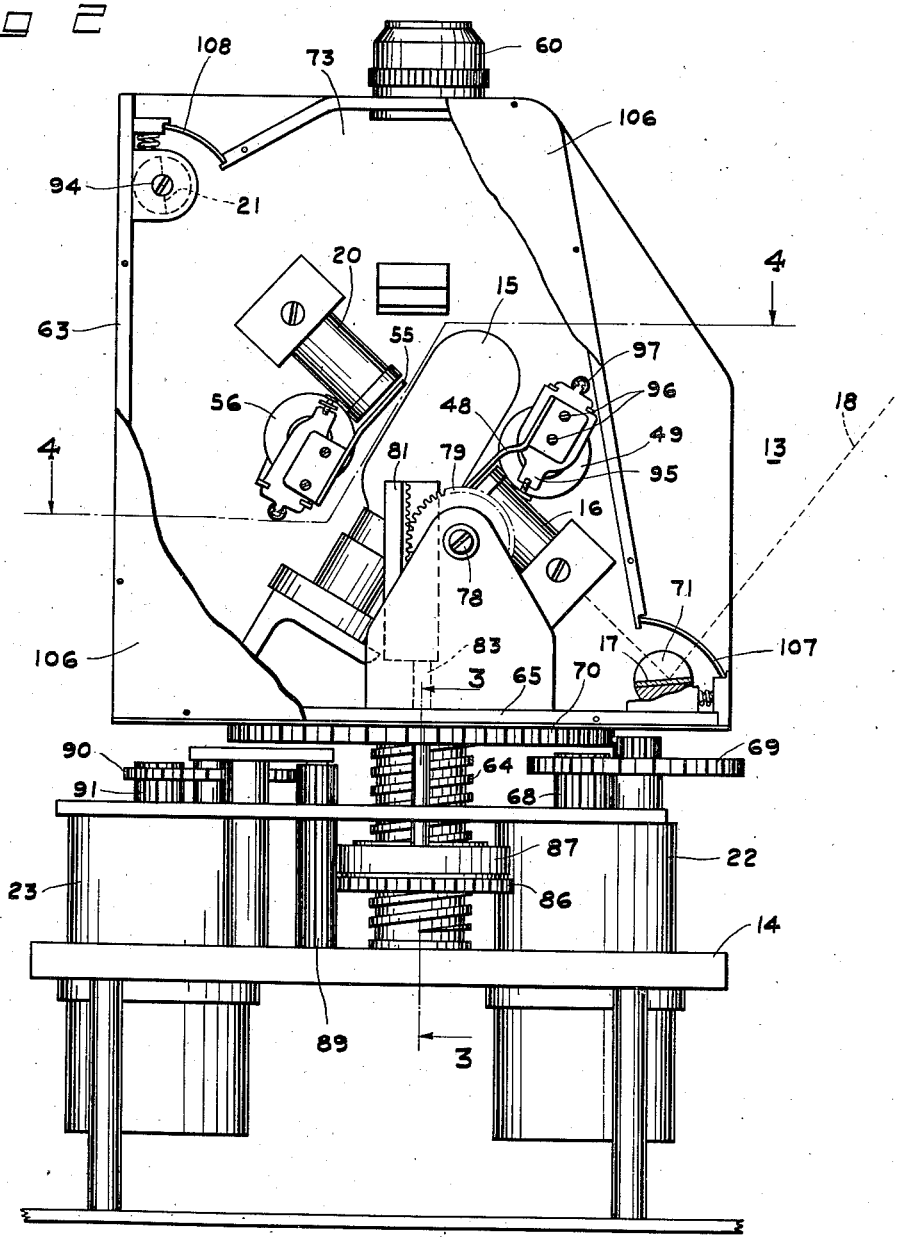
INVENTOR.
HENRY W. McDOWELL
BY
ATTORNEY Jan. 6, 1948.                H. W. McDOWELL                2,433,860
                              PLOTTING APPARATUS
                           Filed March 19, 1946            3 Sheets-Sheet 3
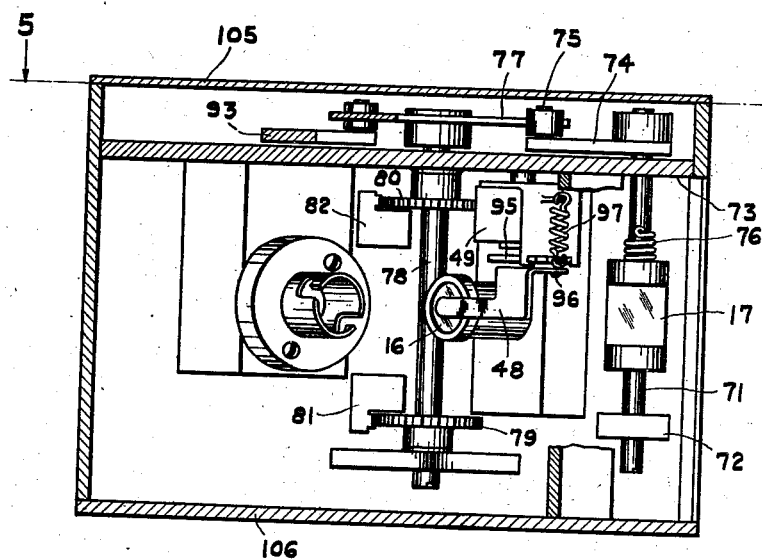
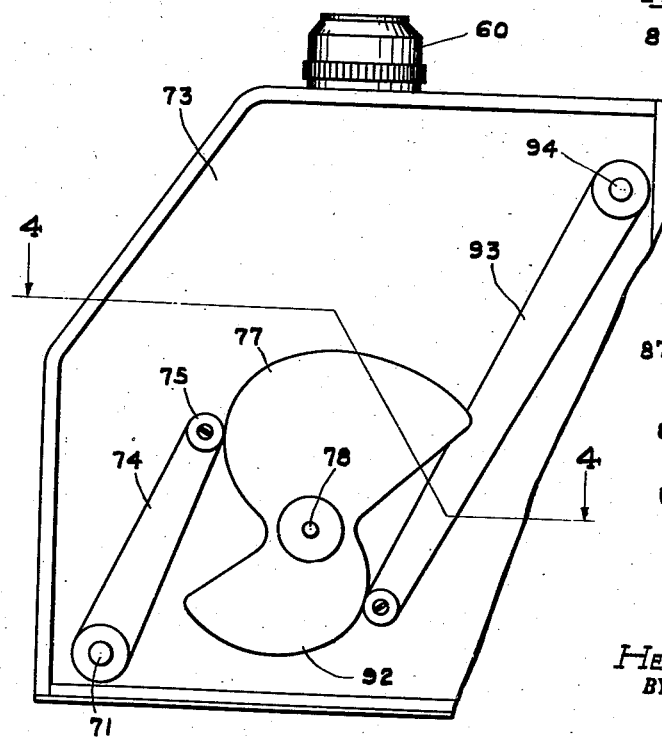
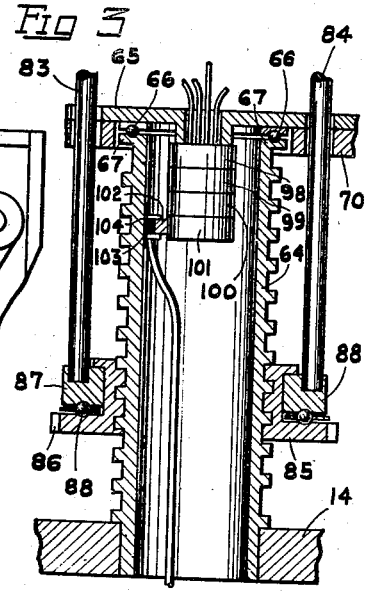
INVENTOR.
HENRY W. McDOWELL
BY
M. A. Hayes
ATTORNEY Patented Jan. 6, 1948

2,433,860

UNITED STATES PATENT OFFICE 2,433,860

PLOTTING APPARATUS

Henry W. McDowell, United States Navy,
Summit, N. J.

Application March 19, 1946, Serial No. 655,535

6 Claims. (Cl. 177—351)

(Granted under the act of March 3, 1883, as
amended April 30, 1928; 370 O. G. 757)

This invention relates to plotting apparatus, and more particularly to apparatus for making semi-permanent plot of position as indicated by a position indicating means such as a radar.

For ship navigation and other purposes there have been developed range and bearing indicating equipments now commonly known as radars. To indicate the information detected by a radar, a form of presentation has been developed known as "plan position indicator," or PPI. This presentation consists of an electron beam appearing radially on the circular face of an oscilloscope, which beam rotates synchronously with the radar antenna. The beam is intensity modulated in its radial sweep so that echoes appear as bright spots, or traces, on the face of the scope. The net effect is to present, substantially, a radar map of the area surrounding the antenna, represented by the center of the scope.

To increase efficiency in the use of information thus obtained, it is desirable that semi-permanent plots of temporal changes in echo, or trace positions be made at intervals of no longer than a minute or two. For this purpose, there has been devised a polar coordinate plotting surface, constituting substantially a magnified duplication of the PPI scope face.

It is an object of this invention to provide means for repeatedly conveying echo position information from the PPI scope to one or more plotting surfaces.

It is a further object of this invention to provide means for transferring such information not only quickly but also accurately.

It is a still further object of this invention to provide a system for conveying plotting information which utilizes only two human operators, and which provides rapid and sure means whereby the plotting operator may know with certainty when the radar operator is indicating an echo and whereby the radar operator may know with certainty that the plotting operator has made a record so that he, the radar operator, may then move on to indicate a succeeding echo.

The accomplishment of these objects makes feasible the placing of a plotting table on the bridge of many vessels, thus benefitting greatly in the tactical operation of the vessel.

In accomplishing these and other objects of the present invention, I have provided improved details of structure, the preferred form of which is illustrated in the accompanying drawings, wherein:

Fig. 1 illustrates schematically the complete apparatus of this invention including the radar, the plotting table, and the signaling circuit therebetween;

Fig. 2 is a detail view of the marking means, or "lighthouse," of this invention;

Fig. 3 is a fragmentary sectional view taken along line 3—3 of Fig. 2;

Fig. 4 is a sectional view taken along line 4—4 of Fig. 2; and

Fig. 5 is a side view of the lighthouse with the cover plate removed, taken along line 5—5 of Fig. 4.

Referring more in detail to the drawings:

The apparatus shown in Fig. 1 consists of a plotting table 10 having a circular, flat, translucent top 11 marked with polar coordinates (not shown). Under the table, mounted on the deck 12, is a marking means which, in this specification, will be called a "lighthouse," for a reason to become presently apparent. The lighthouse is shown at 13 rotatably mounted on a base 14.

Within lighthouse 13 is mounted an electrical lamp 15, a beam 18 from which is directed by lens assembly 16 against a small mirror 17, and is then reflected upward to surface 11, where it forms a spot of light 19. A second beam system utilizing lamp 15, lens assembly 20, and mirror 21 is also provided, for use when it is desired to shift range on the radar, as will be described hereinafter. Mirrors 17 and 21 are used alternatively, not concurrently.

Mounted on base 14 are a pair of tele-motors 22 and 23 which serve, respectively, to rotate lighthouse 13 and to tilt mirrors 17 and 21. Thus, by control of the shaft positions of tele-motors 22 and 23, the spot of light 19 may be made to appear at any point desired on surface 11. That is to say, tele-motor 22, by controlling the rotational position of lighthouse 13, controls the circumferential, or angular, coordinate defining the position of spot 19; while tele-motor 23, by controlling the amount of tilt of mirror 17, controls the radial coordinate of spot 19.

For the purpose of feeding information to the two coordinates controlling members 13 and 17 described above, there is employed a position generating system associated with PPI scope 24 forming the face of a cathode-ray tube 25. Echo-producing objects surrounding the radar antenna are painted at 26 by a rotating, radial cathode-beam 27 in the conventional manner. Also included as part of the PPI system is a range marker 28, artificially applied to radial sweep 27 by means of a range mark generator 29. The delay introduced by mark generator 29 may be manually varied through crank 30, under the control of the radar operator.

An azimuth marker is provided in the form of a mechanical cursor positioned in front of PPI scope 24 and represented in Fig. 1 by line 31. Cursor 31 preferably consists of a visible line having an arrowhead 22 at one end thereof etched in a transparent window held in place by means of a ring gear 33. Pinion 34, rotated by operator-controlled crank 35, meshes with gear 33 and provides a means for rotating cursor 31.

Thus when the radar operator turns crank 30, the range delay generated in 29 and transmitted to beam control coil 36 through slip rings 37 causes range marker 28 to move in and out along radial sweep 27 forming range circle 38 at any desired radius. As the radar operator rotates crank 35, gear 33 is rotated, causing cursor 31 to rotate at any desired angular position. In the illustration shown, range circle 38 and cursor 31 have been caused to intersect directly over an echo 39. The operation thus described briefly is known in the art and forms no part of the present invention.

In order to convey the information characterized by the particular coordinate positions of cursor 31 and range circle 38 to the corresponding coordinate-defining members in lighthouse 13, a position transmitting system is provided consisting of tele-motors 22 and 23, described above, the positions of which are determined by the positions of tele-generators 40 and 41, respectively, mounted in the radar. As shown, the shaft position of tele-generator 41 is determined by the position of operator-controlled crank 30 through gears 42 and 43. Likewise, the position of the shaft of tele-generator 40 is determined by the position of operator-controlled crank 35. Electrical signals from tele-generators 40 and 41 are conveyed to tele-motors 22 and 23, respectively, by multi-conductor cables 44 and 45, respectively, when they serve to control shaft positions of the respective tele-motors.

In order to inform the plotting operator at table 10 when spot 19 is actually in a position corresponding to an echo such as 39, a signaling system is provided as shown at 46 and 47, representing the portions of the signaling system at the radar and at the plotting table, respectively. In order that spot 19 will appear on surface 11 only when cursor 31 and range circle 38 have been intersected over a target 39, a shutter 48 is interposed in the path of beam of light 18 between lamp 15 and lens assembly 16. Shutter 48 normally lies in the path of the light and is withdrawn therefrom by the action of a relay 49, illustrated in Fig. 2, to be described hereinafter. The relay is illustrated schematically in Fig. 1 as a solenoid coil incorporated in electrical control system 47.

Relay 49 is energized from voltage source 50 through a foot switch 51 under control of the radar operator. Thus, when switch 51 is closed relay 49 is energized, withdrawing shutter 48 from in front of lens assembly 16, allowing spot 19 to appear on surface 11 at the position pre-determined by the setting of cursor 31 and range circle 38. Simultaneous with the energization of relay 49, relay 52 is energized through normally closed switch 53, under the control of the plotting operator. Contacts 54 of relay 52 shunt switch 51, so that momentary closing of switch 51 energizes relay 49 and causes contacts 54 to bridge switch 51 as long as relay 52 is energized. Light 54a indicates to the radar operator when spot 19 is visible on surface 11. When the plotting operator has noted the position of light spot 19 on surface 11 with a mark from a grease, or china marking, pencil he opens switch 53, preferably carried at the end of a flexible cable, thereby deenergizing relay 52, opening contacts 54 and allowing shutter 48 to intercept light beam 18.

In certain installations, the radar may have a plurality of ranges; lighthouse 13 is constructed to accept data from two such ranges. For example, as illustrated in Fig. 1, it will be assumed that the outer end of radial sweep 27 represents a long range; for this use range mirror 17 in lighthouse 13 is employed as described above. In this case, range circle 38, when moved to the outer edge of PPI scope 24, causes light spot 19 to appear at the extreme edge of surface 11.

If desired, radar scope 24 may be arranged so that the outer edge of the face corresponds to a short range instead of a long range. In this event, range circle 38, when moved to the outside of scope 24, should cause light spot 19 to appear at some point well within surface 11, instead of at the extreme edge thereof. Inasmuch as mirror 17 is directed toward the extreme edge of surface 11 whenever range circle 38 is moved to its extreme outward position, it is necessary to provide a second mirror system, alluded to hereinbefore by reference to numerals 20 and 21.

To control incidence of the light beam upon mirror 21, there is provided a shutter 55, similar to shutter 48 and controlled in like manner by a relay 56. Selective operation of relay 49 or relay 56 is made possible through a relay 57 controlling a double throw switch 58, which operates to apply voltage either to relay 49 or to relay 56. Energization of relay 57 is controlled through switch 59, preferably associated with the radar range switch.

Thus, on long range, switch 59 is open, with switch 58 being biased upwardly, thereby preselecting relay 49 for energization. On short range, switch 59 is automatically closed, energizing relay 57 and pulling switch 58 into the lower position, thereby preselecting relay 56 for energization.

In order to identify the center of lighthouse 13 on surface 11, a portion of the light from lamp 15 is directed upward through a colored lens assembly 60 as a beam 61, forming a colored spot 62 on surface 11. Beam 61 thus coincides with the rotative axis of lighthouse 13 and spot 62 corresponds to the center of PPI scope 24.

A detailed description of the lighthouse 13, and the manner in which rotary motion is imparted to lighthouse 13 and tilting motion to mirrors 17 and 21, the two motions being entirely independent of each other, will now be set forth.

Referring to Fig. 2, lighthouse 13 will be seen to consist of a housing 63 mounted to rotate on base 14. The actual mounting for housing 63 is provided by an externally threaded cylinder 64 anchored at its bottom end in base 14.

Referring to Fig. 3, the floor plate 65 of housing 63 will be seen to rotate upon bearings 66 coacting with the top flange 67 of cylinder 64. Tele-motor 22 causes housing 63 to rotate through the conventional action of gears 68, 69 and 70, the latter being fixedly attached to floor plate 65 of housing 63.

The manner in which mirrors 17 and 21 are caused to rotate responsive to rotation of tele-motor 23 will now be described. Mirror 17 is mounted on a shaft 71 journaled in a stanchion 72 and the inner wall 73 of lighthouse 13 (Fig. 4). Shaft 71 extends outside of wall 73 and to it is fixed a rocker arm 74 (Fig. 5). Roller 75 on the end of arm 74 is biased by a spring 76 on shaft 71 so as to bear continuously against cam 77, which is anchored to a shaft 78 on which are mounted gears 79 and 80 (Fig. 4). Gears 79 and 80 coact with racks 81 and 82, respectively. Thus it will be seen that up and down motions of racks 81 and 82 causes mirror 17 to tilt in accordance with the particular equation to which cam 77 is cut.

Racks 81 and 82 are mounted atop posts 83 and 84, respectively, which extend through holes in floor plate 65 downward parallel to cylinder 64 (Fig. 3). A nut 85, having gear teeth 86 around the circumference thereof, coacts with the threads on cylinder 64 and carries a washer 87 journaled thereon in ball-bearings 88. Fixedly anchored in washer 87 are the lower ends of posts 83 and 84 bearing racks 81 and 82, respectively. It will thus be seen that rotation of nut 85 through gear teeth 86 causes racks 81 and 82 to move up and down without in any way affecting the angular position of lighthouse 13. Likewise, rotation of lighthouse 13 through gear 70 will in no way affect the vertical position of racks 81—82 because of the journaling action of washer 87 on nut 85.

Gear teeth 86 of nut 85 coact with pinion 89 which is made sufficiently long to accommodate the full vertical motion of nut 85 on the threads of cylinder 64. Pinion 89 is in turn rotated through the conventional action of gears 90 and 91, the latter being attached to the shaft of tele-motor 23. Through the operation of the mechanism described above, it will be seen that rotation of the shaft of tele-motor 23 causes tilting of mirror 17, the relationship between the two motions being determined by the equation of cam 77. Cam 77 is cut to compensate for the fact that spot of light 19 actually appears on a plane (surface 11) instead of on the circumference of a circle. In this manner, the correspondence between the position of range circle 38 and the radius of spot 19 may be kept accurate for all positions of range crank 30.

Mirror 21 is actuated through shaft 78 in a manner similar to the actuation of mirror 17, with cam 92 corresponding to cam 77, arm 93 corresponding to arm 74, and shaft 94 corresponding to shaft 71.

The manner in which shutter 48 selectively intercepts light beam 18 is best seen in Fig. 4, where shutter 48 is shown anchored to armature 95 of relay 49 by means of screws 96. As shown, spring 97 normally biases armature 95 so that shutter 48 occupies a position blocking light beam 18. It will be understood that relay 56 has component parts corresponding to those just described for relay 49.

In order to supply the electrical connections to relays 49 and 56 and to light 15, and at the same time permit free rotation of lighthouse 13, four slip-rings 98, 99, 100 and 101 are provided depending from the center of floor plate 65 into cylinder 64 (Fig. 3). Against each slip-ring bears a brush, exemplified by brush 102 biased against ring 101 by a spring 103. The brush assembly is insulatedly anchored to the inside of cylinder 64 as shown at 104. Cover plates 105 and 106 complete the assembly of housing 63. Celluloid windows 107 and 108 covering mirrors 17 and 21, respectively, complete the enclosure.

Operation

The manner of use of the above described apparatus will now be described.

Two human operators are provided, one at the radar, the other at the plotting table.

The radar operator distinguishes an echo 39 which he wishes to have plotted on surface 11 by the plotting operator. To accomplish this he turns crank 35 until the arrow-bearing half of cursor 31 passes radially above echo 39. He then rotates range crank 30 until range circle 38 traced by luminous range spot 28 intersects echo 39. He then closes foot switch 51.

At the plotting table, rotation of crank 35 has caused lighthouse 13 to assume an angular position corresponding to that of cursor 31. This has been brought about through the action of position transmitting system 40—44—22 and through gears 68, 69 and 70 as hereinbefore described. Similarly, rotation of crank 30 has caused mirror 17 to be tilted to such a position that beam of light 18 may be directed against surface 11 to a point out from the center 62 a distance corresponding to the range at which circle 38 is placed. Closing of foot switch 51 actuates relays 49 and 52, whereupon switch 51 may be released, the circuit being maintained by switch 54. Operation of relay 49 withdraws shutter 48 from the path of light beam 18, allowing spot 19 to appear at the proper point on surface 11. The plotting operator thereupon makes a small mark over spot 19.

Having recorded the echo, the plotting operator opens switch 53 deenergizing relay 52 which in turn deenergizes relay 49. Shutter 48, biased by spring 97, returns to its position intercepting beam 18, and spot 19 disappears.

The radar operator, noting that light 54a has gone off, then turns crank 35 and 30 until cursor 31 and range circle 38 again intersect over an echo to be plotted, whereupon the operation above described is repeated.

Should the radar operator switch the PPI scope to short range, switch 59 automatically closes, energizing relay 57 and selecting relay 56 for operation instead of relay 49. Short range mirror 21 then receives the beam of light through the intermittent withdrawal of shutter 55.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. Polar plotting apparatus comprising a substantially plane, translucent member, a base spaced from the plane of said member, a screw mounted on said base and having its axis normal to said member, a housing rotatable on said base around the axis of said screw, a nut on said screw, a washer mounted on said nut and rotatable with respect thereto, a rack mounted on said washer and extending into said housing, a pinion mounted within said housing meshing with said rack, a mirror rotated in response to rotation of said pinion, a light source directing a beam of light toward said mirror, a shutter positioned across the beam of light from said source, a control relay effective when energized to withdraw said shutter from the beam, indicating means effective to indicate position to be plotted, a rotatable azimuth cursor cooperative with said indicating means, means effective to rotate said housing in response to rotation of said cursor, a range marker cooperative with said indicating means, means effective to rotate said nut in response to operation of said range marker, a first switch effective when closed to energize said control relay, a holding relay energized thru said first switch and having a holding contact shunting said first switch, and a second switch, biased closed, in the circuit of said holding relay.

2. Polar plotting apparatus comprising a substantially plane, translucent member, a base spaced from the plane of said member, a screw mounted on said base and having its axis normal to said member, a housing rotatable on said base around the axis of said screw, a nut on said screw, a washer mounted on said nut and rotatable with respect thereto, a rack mounted on said washer and extending into said housing, a pinion mounted within said housing meshing with said rack, a mirror rotated in response to rotation of said pinion, a light source directing a beam of light toward said mirror, a shutter positioned across the beam of light from said source, a relay effective when energized to withdraw said shutter from the beam, indicating means effective to indicate position to be plotted, a range marker cooperative with said indicating means, means effective to rotate said nut in response to operation of said range marker, an energizing circuit for said relay, a first switch in said circuit effective when actuated to energize said relay, and a second switch in said circuit effective when actuated to deenergize said relay.

3. Plotting apparatus comprising a substantially plane surface, marking means spaced from the plane of said surface and effective to apply a mark to said surface, indicating means effective to indicate position to be plotted, a first cursor movable over a first coordinate of said indicating means, a second cursor movable over a second coordinate of said indicating means, means effective to position said marking means along said first coordinate responsive to said first cursor, means effective to position said marking means along said second coordinate responsive to said second cursor, a control relay effective to control application of the mark by said marking means, an energizing circuit for said control relay, a first switch in said circuit effective when actuated to cause application of the mark by operation of said control relay, a holding relay energized in parallel with said control relay and having contacts shunting said first switch, and a second switch in the energizing circuit of said holding relay effective when opened to remove application of the mark by operation of said control relay.

4. Plotting apparatus comprising a substantially plane surface, marking means spaced from the plane of said surface and effective to apply a mark to said surface, indicating means effective to indicate position to be plotted, a first cursor movable over a first coordinate of said indicating means, a second cursor movable over a second coordinate of said indicating means, means effective to position of said marking means along said first coordinate responsive to said first cursor, means effective to position said marking means along said second coordinate responsive to said second cursor, a relay effective to control application of the mark by said marking means, an energizing circuit for said relay, a first switch in said circuit effective when actuated to cause application of the mark by operation of said relay, and a second switch in the circuit of said relay effective when actuated to remove application of the mark by operation of said relay.

5. Plotting apparatus comprising a substantially plane surface, marking means spaced from the plane of said surface and effective to apply a mark to said surface, indicating means effective to indicate position to be plotted, a first cursor movable over a first coordinate of said indicating means, a second cursor movable over a second coordinate of said indicating means, means effective to position said marking means along said first coordinate responsive to said first cursor, means effective to position said marking means along said second coordinate responsive to said second cursor, means effective to control application of the mark by said marking means, and means for actuating said mark controlling means.

6. Plotting apparatus comprising a substantially plane surface, marking means spaced from the plane of said surface and effective to apply a mark to said surface, said marking means being mounted for rotation about an axis normal to said surface, indicating means effective to indicate position to be plotted, a first polar cursor rotatable over said indicating means, a second polar cursor movable radially over said indicating means, means for positioning said marking means angularly in response to said first cursor, and means for positioning said marking means radially in response to said second cursor.

HENRY W. McDOWELL.

REFERENCES CITED

The following references are of record in the file of this patent:

UNITED STATES PATENTS

| Number | Name | Date |
|---|---|---|
| 1,551,393 | Hewlett | Aug. 25, 1925 |
| 1,695,483 | Dawson | Dec. 18, 1928 |
| 2,402,688 | Skurnick | June 25, 1946 |
| 2,413,300 | Dunn | Dec. 31, 1946 |